US009319922B2

(12) United States Patent
Acker et al.

(10) Patent No.: US 9,319,922 B2
(45) Date of Patent: Apr. 19, 2016

(54) SYSTEM AND METHOD FOR MULTICAST OVER HIGHLY MOBILE MESH NETWORKS

(71) Applicant: Rajant Corporation, Malvern, PA (US)

(72) Inventors: David Acker, Malvern, PA (US); Paul R. Hellhake, Downingtown, PA (US); William Jordan, Ephrata, PA (US); Joseph E. Parks, Coatesville, PA (US)

(73) Assignee: Rajant Corporation, Malvern, PA (US)

( * ) Notice: Subject to any disclaimer, the term of this patent is extended or adjusted under 35 U.S.C. 154(b) by 165 days.

(21) Appl. No.: 14/075,669

(22) Filed: Nov. 8, 2013

(65) Prior Publication Data
US 2014/0169171 A1    Jun. 19, 2014

Related U.S. Application Data

(60) Provisional application No. 61/738,730, filed on Dec. 18, 2012.

(51) Int. Cl.
| | |
|---|---|
| *H04L 1/00* | (2006.01) |
| *H04W 28/02* | (2009.01) |
| *H04L 12/18* | (2006.01) |
| *H04L 12/801* | (2013.01) |
| *H04W 40/12* | (2009.01) |
| *H04L 12/761* | (2013.01) |

(52) U.S. Cl.
CPC ......... *H04W 28/021* (2013.01); *H04L 12/189* (2013.01); *H04L 12/1877* (2013.01); *H04L 47/15* (2013.01); *H04L 45/16* (2013.01); *H04W 40/12* (2013.01)

(58) Field of Classification Search
CPC ......... H04L 47/10; H04L 47/13; H04L 47/14; H04L 47/11; H04L 47/12
USPC ......... 370/254, 390, 338, 256, 252, 389, 331, 370/310, 393
See application file for complete search history.

(56) References Cited

U.S. PATENT DOCUMENTS

2009/0303902 A1*  12/2009  Liu et al. ............. 370/254

* cited by examiner

*Primary Examiner* — Dady Chery
(74) *Attorney, Agent, or Firm* — Blank Rome LLP

(57) ABSTRACT

Systems, devices, and methodology for removing echo and reducing congestion in multicast (broadcast) over a dynamic self-healing mobile mesh network, by use of discrete embedded computers synchronously tracking mesh connections and link quality across multiple RF connections, keeping multicast both efficient and effective in a highly kinetic, ever changing, mesh topology.

8 Claims, 4 Drawing Sheets

200 The Mesh Multicast Problem

202 A Packet is Broadcast

210 Every Node Re-Broadcasts

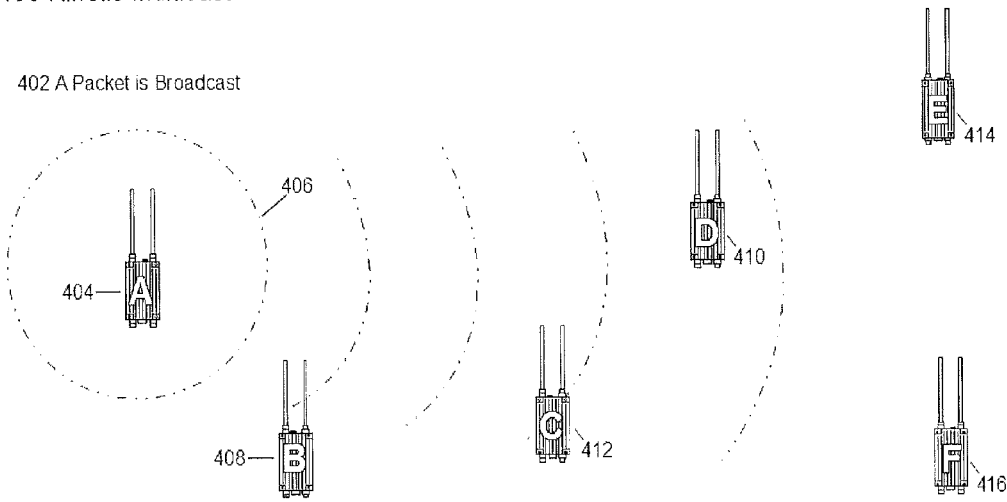
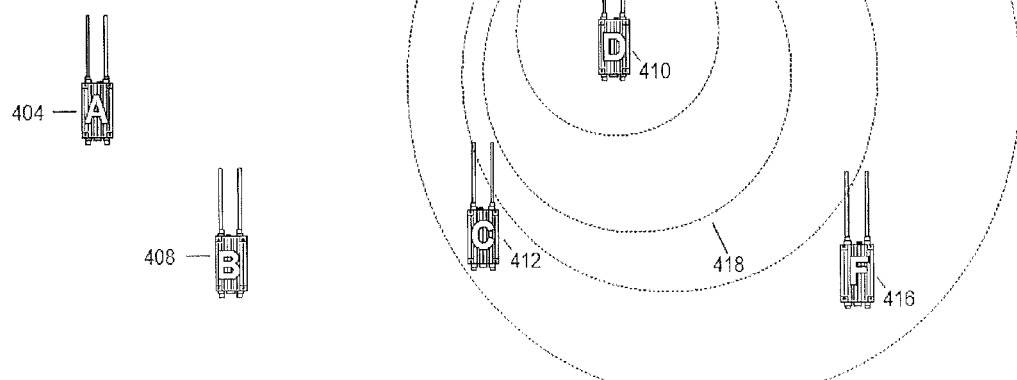

SYSTEM AND METHOD FOR MULTICAST OVER HIGHLY MOBILE MESH NETWORKS

REFERENCE TO RELATED APPLICATION

The present application is a non-provisional of U.S. Provisional Application Ser. No. 61/738,730, filed Dec. 18, 2012, whose disclosure is hereby incorporated by reference in its entirety into the present disclosure.

FIELD OF THE INVENTION

The present invention concerns tactical and other highly mobile communications networks. Such networks are distinguished by their ability to self-organize and heal connections, as radio nodes enter and leave each other's direct communications ranges with minimal impact to the performance of other nodes on the network.

DISCUSSION OF THE KNOWN ART

As illustrated in FIG. 1, a mesh network 100 includes a potentially large number of radio nodes 102, and signals regularly pass from node to node over one or more radio frequencies 104 at the same time.

A classic mesh networking problem 200 is illustrated in FIG. 2a. In most networks, there are various ways to allow for a network multicast (broadcast) 202, in which a single message 206 is sent from an originating node 204 to every other node 208 in a system at once, generally over each available radio, for radios with parallel connections.

On a standard fixed network this works fine, as a single multicast is expected to reach every node on a given network. Switches, routers, and repeaters only have to repeat the multicast, and this is only repeated to a different network segment. But in a wireless mesh network, every node is also a repeater, which will have the task of relaying the message. This creates multiple layers of redundancy in data broadcast transmission and causes a network to fail by being overwhelmed by data, much of which is redundant.

FIG. 2b shows a simplified version of the problem this causes. Since all mesh nodes are also repeaters, they dutifully rebroadcast any packets received 212. In the case of a single transmission received by three nodes, that is only three packets rebroadcast, which is manageable on a small network. Even then, the channel will be congested during that multicast as neighboring nodes will step on each other, and subsequent packets in a streaming multicast will be blocked by echoes of previous packets. The result is a lower performing network that negates the advantage of using multicast in the first place and, given enough nodes and packets, will impede real-time streaming.

As mesh size scales to tens, hundreds or more, a single full multicast would clog the network with redundant packets for a sustained period of time, causing failure of the network. The standard way of relaying a multicast is called flooding, where each receiving node dutifully rebroadcasts its packets as a new multicast. This is fine for rebroadcast through routers, but in a mesh, it exponentially increases the traffic on the network, as each node rebroadcasts repeatedly, and compromises communications until the network completely deteriorates and all communication is lost. An analogy is to envision a room full of people, all engaged in conversations. If just two people are conversing, all or most will be able to hear the conversation. As more conversations begin to increase the noise level in the room, no one discussion can be heard from any distance as the noise created by the other conversations tends to degrade the quality of the sound in the room and in each conversation, making a conversation with another person impossible if they are separated by more than one other conversation. Similarly, as the noise in the room increases, each conversation becomes more difficult for each listener to hear as the volume in the room increases.

The typical mesh implementations can avoid loops, using packet sequences or other methods, but in flooding, it cannot avoid each node echoing at least once, thereby exponentially multiplying the conversations and noise on the network resulting in greatly diminished communications.

There are some attempts at solutions found in the prior art. Some solutions suggest trying to manage the problem of retransmitting by transforming a multicast into multiple parallel multicasts, forcing the use of alternating channels where Node A connects to Node B via channel 1 and node B connects to node C via channel 6 and node C connect to node D via channel 11 and so on. This requires many radios and a large amount of spectrum and is necessarily complicated with mobility, as different nodes cannot communicate with one another in all cases, and each node loses the redundancy advantage of different frequency radios working in parallel.

Another solution in the prior art creates a multicast spanning tree to find a loop through-route throughout the mesh. In short, the network attempts to find a shortcut between the branches of the spanning tree. This solution vastly reduces efficiency and requires more computing resources and more complexity in the mesh architecture. Network speeds and mobile computing resources make recomputing a tree too slow to maintain media streams in real-time. Additionally, this solution is vulnerable to mesh changes as the entire spanning tree must be recalculated constantly before packets can be forwarded again.

Yet other solutions attempt to track multicast requests over the network and communicate to all other nodes the multicast addresses they are interested in. Keeping these lists up to date can be problematic and subject to congestion based on dropped packets, changes in the network, topography and other influences. And in a large highly mobile mesh, the need to recalculate the spanning tree on any change in the network topology compromises throughput, consumes limited bandwidth and computing resources, and compromises real-time use of the network.

SUMMARY OF THE INVENTION

A dynamic method of multicast suitable for highly mobile, highly volatile, mesh networks is described herein. The invention is an improvement on existing methods of mesh network multicast/broadcast, to minimize the number of packets rebroadcast, optimally to only those that need to be rebroadcast as determined by an embedded computer program, thereby eliminating congestion and associated failure of the network due to congestion. This maintains multicast as a viable option for use on highly mobile mesh networks.

The strategy is to use intelligent methods for multicast, by making a reliable and best calculated cost estimate on whether packets ever need to be rebroadcast to nodes and if so, to which nodes in the network. Mesh nodes will transmit a list of peers (neighboring nodes) that can be reached via "good quality" links. Good quality is determined by an embedded computer chip with a program that determines the cost of each packet. Peers are only noted if one of the direct connections to the peer is the primary or alternate route used by the mesh to reach that peer with unicast traffic. This means that is either the lowest cost route or the next lowest cost recently heard from route. Peers with direct links with very low cost are always included.

Cost is a measure of the time it takes a packet to travel from one end of a path to another and may include multiple node hops. A node hop occurs when a packet cannot be routed directly between two nodes, and must be routed through one or more additional nodes to complete the node-to-node path. The node receiving the list of peers stores this path information, When this node later receives a multicast packet from the earlier sender, it will only retransmit the packet to one of its peers if the peer was not originally on the sender's list of peers, i.e., when it sees a node the sender doesn't see.

BRIEF DESCRIPTION OF THE DRAWINGS

A preferred embodiment of the present invention will be set forth in detail with reference to the drawings, in which:

FIGS. 4a and 4b illustrate tactical multicast in a mesh network.

DETAILED DESCRIPTION OF THE PREFERRED EMBODIMENT

Figure 1:
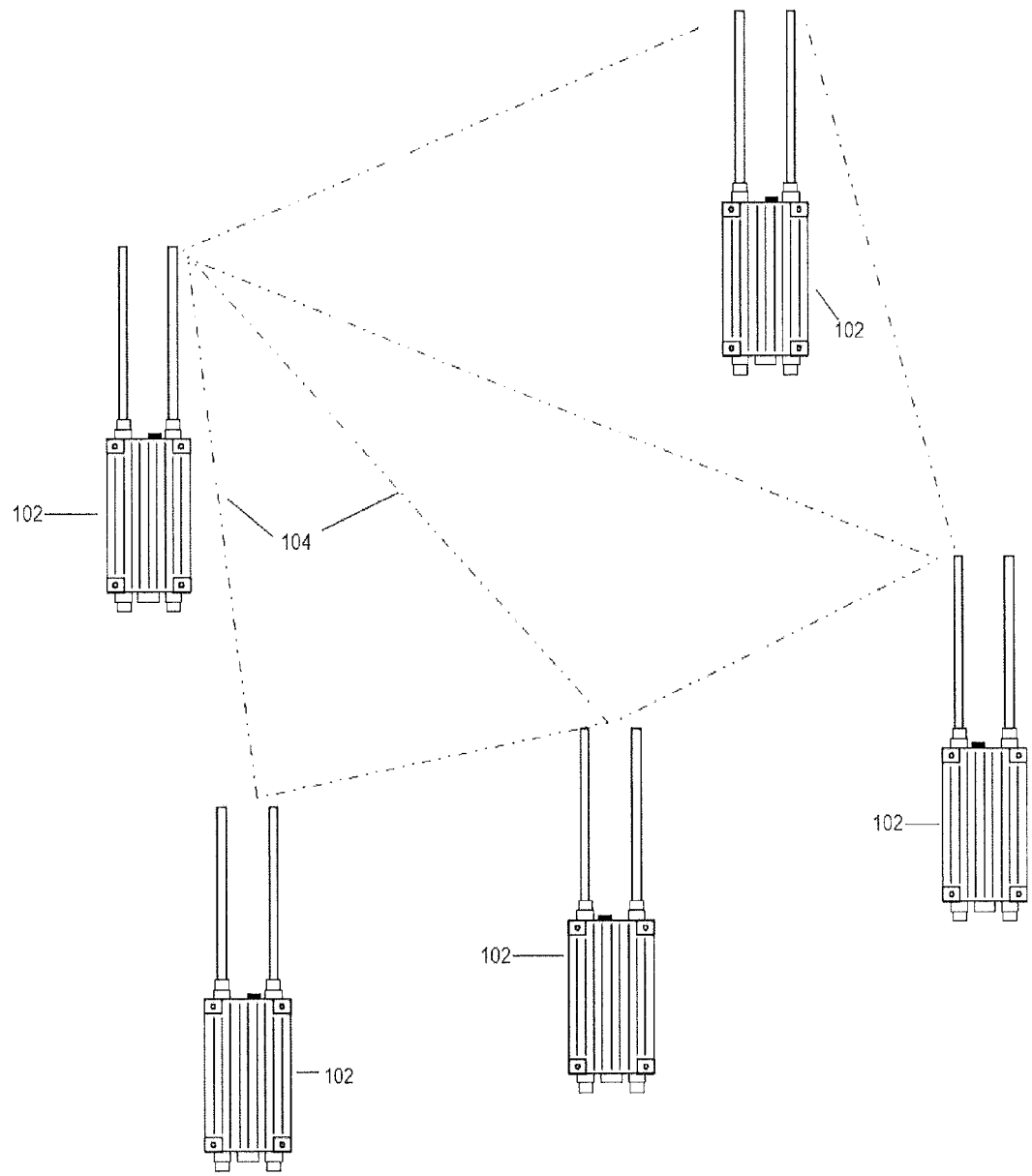
FIG. 1 illustrates a basic highly mobile mesh network, showing example connections between the various radio nodes.
Figure 2A:
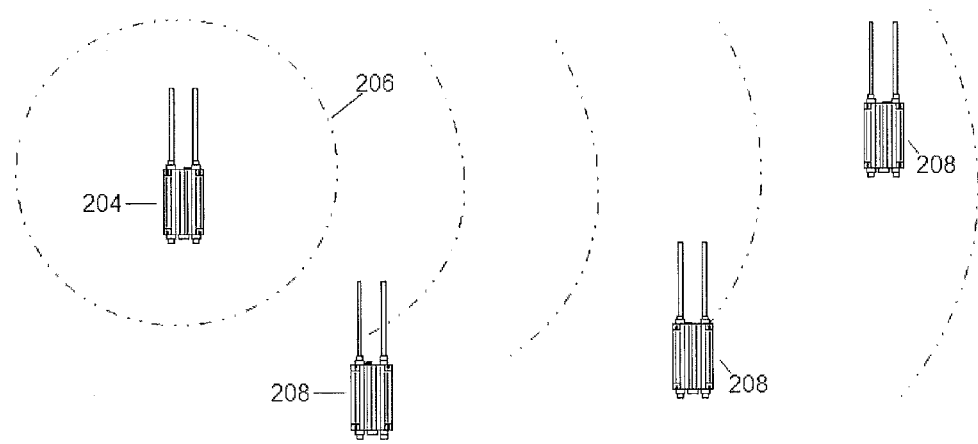
FIGS. 2a and 2b illustrate standard multicast in a mesh network.
Figure 2B:
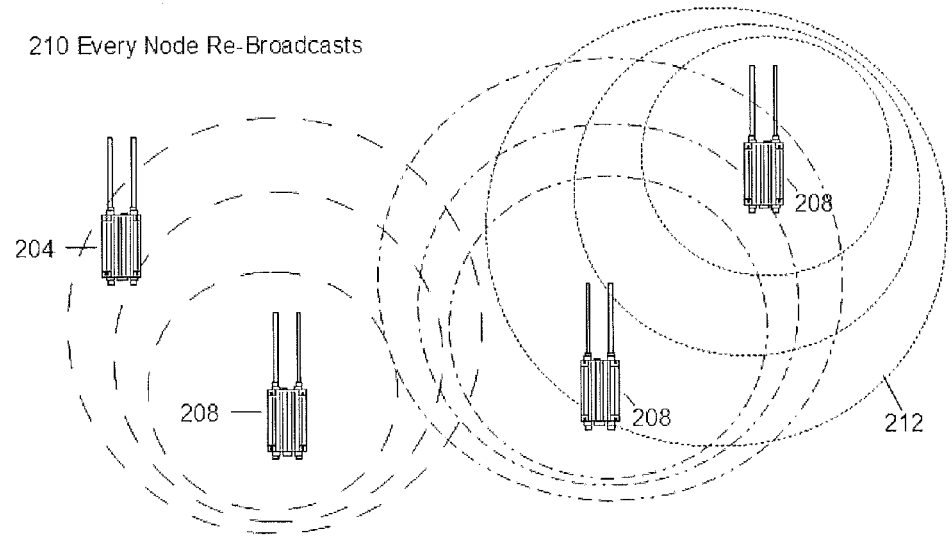

A preferred embodiment of the present invention will be set forth in detail with reference to the drawings.

A standard mesh network manages multicast and broadcast Ethernet traffic by multicasting the packets to all paths via flooding. A flooded packet may use wireless unicast to reach each peer through a reliable connection that will resend a packet when an acknowledgement is not received or it may be sent to the broadcast receive address so that all peers may receive it simultaneously. In multicast, this packet is not sent reliably; it does not receive acknowledgments and is not retried. The choice between the two methods is made by mesh density. If both sides of the connection have greater than or equal to a configurable threshold of peers, the broadcast receive address is used. When a node receives this packet for the first time, it will resend the packet through all of its interfaces using the same process. Packets ultimately reach all nodes using this method but at the cost of many unnecessary transmissions and congestion, as each node rebroadcasts each packet, very likely back to many nodes that have already received it.

There are different methods of mitigating loops beyond the flood. In the preferred embodiment of this invention, loops are identified by a 32-bit per source MAC address sequence number. Each node generates a random starting sequence number for each MAC address that it receives off the LAN or from a wireless client. It increments the sequence number once for each packet it receives, thereby creating a unique identifier for each packet from each source MAC. Each node tracks the last sequence number accepted for a given source MAC address. Each node also tracks the last 32 sequence numbers that were accepted from each MAC so that some out-of-order packets can be accepted. If a sequence number was already accepted by a node it is not accepted again or forwarded, for multicast or unicast, as that would create loops which exponentially increase unnecessary traffic across the network and compromises the stability of the network.

The need for an improved multicast method is easily demonstrated once streaming multicast is used. In a stream, packets are broadcast continuously, often with very little time between packets. In the typical multicast flood, the retransmission of one packet interferes with the previous nodes transmission of the next packet, either by direct collision (new and old are sent simultaneously) or congestion (the retransmits are detected by the originating node, but their presence blocks the new multicast, eventually leading to a traffic jam condition, in which no packets are making it through the network.

One example is exemplified by Tactical Radio over Internet Protocol (TRoIP), as disclosed in U.S. Provisional Patent Application No. 61/734,734, filed Dec. 7, 2012, whose disclosure is hereby incorporated by reference in its entirety into the present disclosure. TRoIP transmits voice data using multicast so that all nodes in a TRoIP conference can receive each packet as a single broadcast message, rather than N-1 messages for a network of N radios using unicast. This is intended to decrease the data load on each node and to decrease spectrum use across the network, versus a unicast model. The problem is that the rebroadcasting done at each node results in interference and decreased performance.

Figure 3:
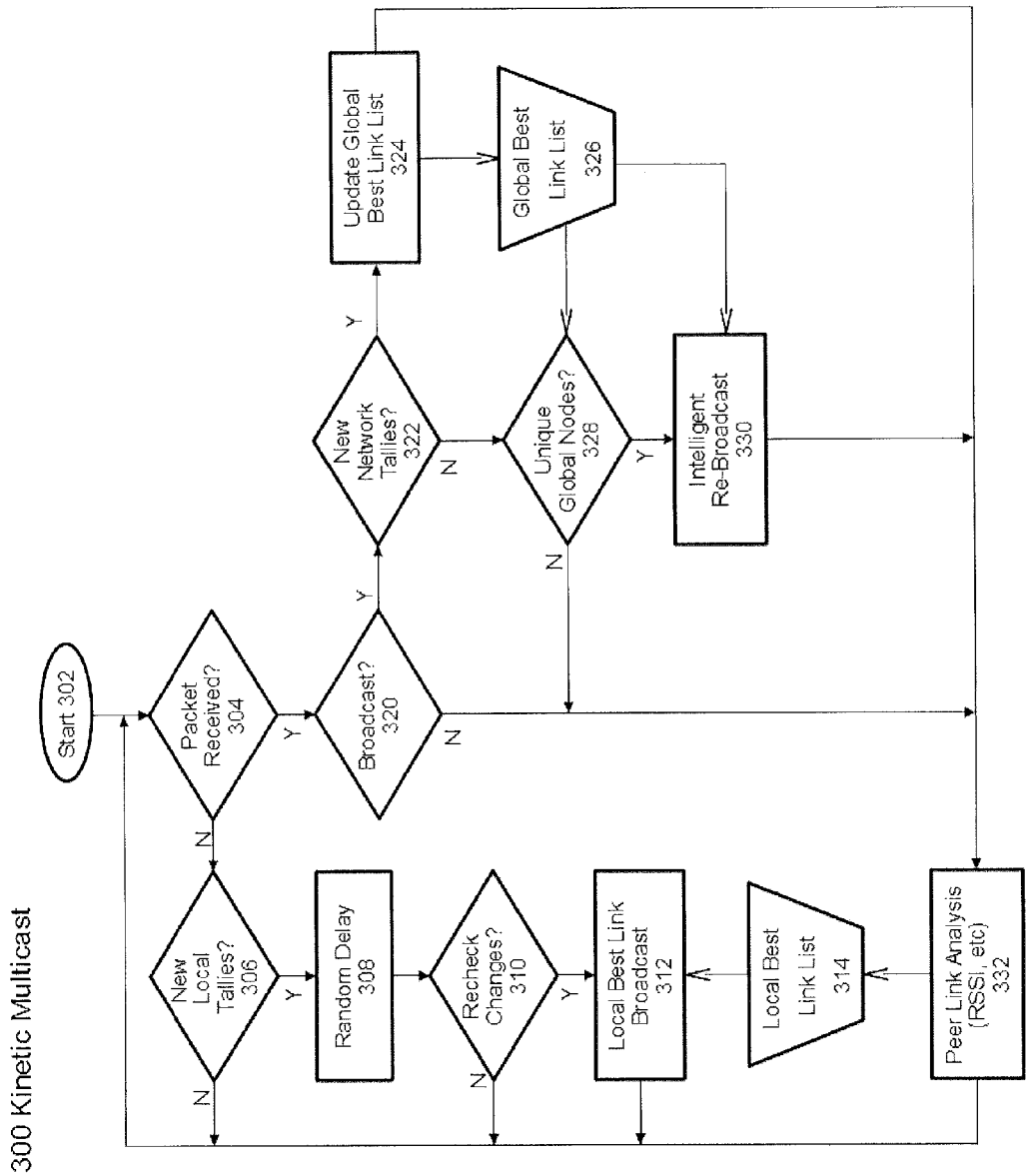
FIG. 3 illustrates tactical multicast as a flowchart.

This invention, dubbed Tactical Multicast, was designed to mitigate this issue. FIG. 3 illustrates the basic control and data flow of the system 300 according to the preferred embodiment. Rather than rebroadcast by flooding, the system tries to ensure that packets are retransmitted only when needed. Each node running tactical multicast will run a local tally of neighboring nodes (peers), tracking and compiling various quality parameters associated with each peer.

At regular events 302, the system will acknowledge received packets 304 if they exist. If there are no new packets to process, the system will check 306 for important updates in the local best node link list 314. The list of peers is not sent immediately in response to network changes, there is some hysteresis on this. When a node detects 306 that a peer now has a good quality link or that a peer has lost all of its good quality links, the node waits 308 a configurable amount of time +a random adjustment to send a new list. If further changes happen before the list is sent, nothing more needs to happen. When the time comes to send the message, the list is created from the most recent data. If by this point, nothing has changed 310 since the last time the list was sent (because the changes reverted to their previous state), nothing is sent. The random adjustment is from 0 to the configured time-1. It is needed to avoid all the nodes alerting each other about a newly arrived or departed node at the same time, causing more collisions. The list of changes is sent as a multicast message 312 and is never retransmitted.

If the system does have a packet received 304, it checks if that packet is a broadcast packet 320. If not, the packet is sent for analysis 332, and possible entry into the local best node list 314. Each node stores a local list of the best quality links from other nodes, those connected at or above a predetermined quality threshold. In the current embodiment, the radio mesh network is consulted, and peers are only noted if one of the direct connections to the peer is the primary or alternate route used by the mesh to reach that peer with unicast traffic.

Cost is a measure of the time it takes a packet to travel from one end of a path to another and may include multiple node hops. As the list of peers is compiled, costs are assigned to the peers based upon the connections the mesh itself is currently using for any travel, node to node. Weaker, more costly connections may well exist, but they're not enumerated here; to any node, the cost is based on either the lowest cost route or the next lowest cost recently heard from route. Peers with direct links, rather than mesh hops, with very low cost are always included. These optimal connect lists are multicast across the network, so that each peer maintains the costing list of every other peer. When the list is received, it is not rebroadcast. The receiver simply stores the information to be used for future multicast data packets received from the sender.

When a received packet is a broadcast/multicast packet 320, it can be either a generic multicast packet or a packet indicating changes to the best node list from another node. If the packet is a best node tally update 322, that node is entered into the global node list on the receiving node under that senders index, then the packet is sent on for link analysis as usual 322. This packet is not rebroadcast; best node lists are only updated directly, never relayed.

When a broadcast/multicast packet does not contain a best list update record 322, its senders list is checked 328 against the global list of nodes 326 for that particular sender. If the local node can't see any nodes not on the senders best link list, nothing more is done; the multicast packet is simply analyzed for link quality 332. If the local node can see nodes not seen by the sender, the multicast packet is intelligently rebroadcast 330.

A tactical multicast example 402 is given in FIG. 4. This assumes a fully functional mesh network, with all nodes running the tactical multicast protocols. Node A 404 has previously sent out its list of good peers as multicast packet. This list of good peers from FIG. 4a would include B 408, C 412, and D 410, but not E 414 or F 416.

Now consider the actual multicast. The originating node A 404 sends out a multicast packet to the mesh. This reaches B 408, C 412, and D 410, but there is no certainty about it reaching E 414 or F 416. Nodes B 408 and C 412 check the list of good peers from node A 404 against their own, and find there are no nodes on their lists that are not also on A's 414 list. So nodes B & C will not forward the packet.

Node D 410 has also received this packet from node A 404, but it checks the good peers lists and finds that it can see E 414 and F 416, but the originator node A cannot. So node D 410 will re-transmit the broadcast packet. Nodes E 414 and F 416 will receive the packet retransmit from node D 410. Upon checking their lists of good peers, they discover that they can only see each other and node D 410, the new originator. So, now, the multicast is complete.

It is actually possible that nodes E 414 and/or F 416 actually did see the original transmission from node A 404. This is not a problem, since as mentioned; the basic mesh protocol already keeps track of packet sequence and will simply ignore a packet that it has seen in the past.

This can also help with many types of multicast and/or broadcast traffic like broadcast ARP requests, GPS location broadcasts, TRoIP/multicast audio, multicast video, etc. The invention essentially allows multicast to remain an efficient protocol across a constantly changing mesh network, This is particularly critical in large mobile networks, where multicast is needed to keep the network performing well.

While a preferred embodiment has been set forth in detail, those skilled in the art who have reviewed the present disclosure will readily appreciate that other embodiments can be realized within the scope of the invention. For examples, disclosures of specific technologies and standards are illustrative rather than limiting. Therefore, the present invention should be construed as limited only by the claims appended to any non-provisional patent application claiming the benefit of the present application, or to any patent issuing therefrom.

What is claimed is:

1. A method for multicasting over a mesh network that prevents network congestion normally associated with multicast relay via flooding, the mesh network comprising a plurality of nodes, the method comprising:
   maintaining, in each of the nodes, a list of nearby nodes with good links, wherein total path traversal time is used to help establish a cost metric for each link into the local node, and wherein each good link is determined using the cost metric;
   periodically broadcasting, from each of the nodes, the maintained list to other ones of the nodes within range; and
   relaying a multicast from each of the nodes only if the node can reach nodes not seen as good by the node sending the multicast.

2. The method as in claim 1, further comprising using mesh management/routing data to optimize selection of good link lists.

3. The method as in claim 1, further comprising using a randomized delay on the good link list broadcast, that prevents multiple nodes from transmitting on top of each other when a peer goes on or off the mesh.

4. The method as in claim 1, operating at OSI Network Layer 2, in which all network addressing is done using MAC-level addresses.

5. A node for multicasting over a mesh network that prevents network congestion normally associated with multicast relay via flooding, the network comprising a plurality of other nodes, comprising:
   a communication component for connecting to the mesh network; and
   a processor configured for:
      maintaining a list of nearby nodes with good links;
      establishing a cost metric for each link into the local node using total path traversal time;
      determining each good link using the cost metric;
      periodically broadcasting the maintained list to other ones of the nodes within range; and
      relaying a multicast only if the node can reach nodes not seen as good by the node sending the multicast.

6. The node as in claim 5, wherein the processor is further configured for mesh management/routing data to optimize selection of good link lists.

7. The node as in claim 5, wherein the processor is further configured for using a randomized delay on the good link list broadcast that prevents multiple nodes from transmitting on top of each other when a common neighbor goes on or off the mesh.

8. The node as in claim 5, operating at OSI Network Layer 2, in which all network addressing is done using MAC-level addresses.

* * * * *